United States Patent

Bardel

[11] Patent Number: 5,944,284
[45] Date of Patent: Aug. 31, 1999

[54] HUMIDIFIER SYSTEM FOR AN AIRCRAFT CABIN

[75] Inventor: Michel Bardel, Maurepas, France

[73] Assignee: Intertechnique, France

[21] Appl. No.: 08/762,678

[22] Filed: Dec. 11, 1996

[30] Foreign Application Priority Data

Dec. 12, 1995 [FR] France .................................. 95 14704

[51] Int. Cl.$^6$ .................................................. B64D 11/00
[52] U.S. Cl. ...................... 244/118.5; 244/1 R; 239/331; 239/329; 297/188.01; 297/188.04
[58] Field of Search .................... 239/331, 332, 239/338, 340, 536, 562, 171, 329; 244/1 R, 118.5, 118.6, 122 R, 136; 454/157; 297/188.01, 188.04, 188.07, 217

[56] References Cited

U.S. PATENT DOCUMENTS

| | | | |
|---|---|---|---|
| 1,331,384 | 2/1920 | Sainsbury . | |
| 3,019,050 | 1/1962 | Spielman | 297/217 |
| 3,330,506 | 7/1967 | Robillard et al. | 244/118 |
| 3,901,414 | 8/1975 | Capra et al. | 239/329 |
| 4,390,479 | 6/1983 | Gates | 239/332 |
| 4,726,429 | 2/1988 | Miller | 244/118.5 |
| 4,974,903 | 12/1990 | Lipschitz et al. | 297/188 |
| 5,052,493 | 10/1991 | Court | 169/9 |
| 5,154,374 | 10/1992 | Beroth | 244/118.5 |
| 5,195,664 | 3/1993 | Rhea | 239/338 |
| 5,402,967 | 4/1995 | Hughes | 244/118.5 |
| 5,636,770 | 6/1997 | Hachinohe et al. | 239/338 |
| 5,699,983 | 12/1997 | Ellsworth | 244/118.5 |

FOREIGN PATENT DOCUMENTS

| | | |
|---|---|---|
| 0603064 | 12/1993 | European Pat. Off. . |
| 2832416 | 2/1980 | Germany . |
| 19500343 | 8/1995 | Germany . |
| 9107208 | 5/1991 | WIPO . |

*Primary Examiner*—Charles T. Jordan
*Assistant Examiner*—Charles R. Ducker, Jr.
*Attorney, Agent, or Firm*—Larson & Taylor

[57] ABSTRACT

For humidifying the air in an aircraft cabin, individual spray nozzles are each directed towards a zone including the face of a passenger and fed with water via a controllable closure valve. Typically, each spray nozzle is fed by a respective cartridge or can of pressurized water located in a receptacle formed in a seatback. The closure valve of each spray nozzle may be individually moved from closed to open position by the passenger

11 Claims, 3 Drawing Sheets

HUMIDIFIER SYSTEM FOR AN AIRCRAFT CABIN

BACKGROUND OF THE INVENTION

The invention relates to conditioning air for aircraft likely to fly at high altitude and including a cabin pressurizing system.

Such a system is fed with outside air, e.g. taken from the compressor of a turbojet. It raises the air to a pressure that is sufficient for the breathing needs of the occupants and it increases its temperature.

By way of example, an airplane flying at an altitude of 11,500 meters (m) is in an atmosphere at 206 millibars and −56° C. The cabin pressurizing system raises the pressure to 810 millibars and the temperature to 22° C. The humidity of air at high altitude is very low. Consequently, the relative humidity of the air injected into the cabin is well below 1%, whereas a relative humidity of 40% to 60% is desirable for the comfort of the occupants. Water vapor given off by the occupants and desorption from cabin materials are quite incapable of coming close to this value.

It might be thought that the problem could be solved by injecting vapor into the system for pressurizing and distributing air. However humidifying all of the cabin air would require a mass of water that is unacceptable for long duration flights. Also, such a system suffers from severe technical and health drawbacks. A large amount of maintenance is required and reliability is low, particularly due to piping oxidization, corrosion caused by condensation, and inorganic deposits. From the health point of view, moving humid air about the cabin and through the air conditioning pipework favors the development of bacteria, contamination by microbes, and proliferation of moss.

SUMMARY OF THE INVENTION

An object of the present invention is to improve the comfort of passengers by increasing the humidity of the air with which they are in contact, while avoiding the above drawbacks.

To this end, there is provided a system for humidifying the air of an aircraft cabin and comprising, at each location apt to be occupied, an individual spray nozzle directed towards a zone including the face of the occupant and fed with water via controllable closure means. The sprayed water evaporates particularly easily since the ambient air in the cabin is dry.

The spray nozzles may be installed in the backs of passenger seats, in the ceiling, in bottom portions of the baggage racks, or inside a partition.

Typically, the water for each occupant is stored locally with its own pressurization means in a removable cartridge so as to constitute self-contained equipment. Such a disposition may then be optional at each seat and can easily be extended to an existing fleet of airplanes as a retrofit. There is no need to install a complex circuit for distributing water under pressure. If one item of equipment fails, that does not prevent the others from operating. The mass of the humidifier as a whole is spread over the airplane according to seat distribution and does not greatly affect trim. Finally, airworthiness certification can be obtained on the basis of a docket relating only to the seats, the ceiling, or the bulkheads. It does not require new certification of the air conditioning system as a whole.

In another embodiment of the invention, the spray nozzles are fed by a circuit that is connected to a common water tank, and optionally to a source of inert gas under pressure. This solution increases the running time of the system and simplifies refilling. To avoid contamination by stagnation and backflow, the controllable closure means are then placed in the immediate vicinity of the nozzles. Thus, there is no risk of bacterial proliferation or of viral contamination, since water supply takes place directly in the zone where the passengers are to be found.

In all cases, the overall water content or moisture of the cabin atmosphere as a whole is only slightly increased, thereby removing corrosion risks. The additional onboard mass is low: 400 milliliters of water suffice to raise to 40% the relative humidity of 51 m$^3$ of dry air at 22° C. and at 810 millibars, i.e. air under the conditions typically found in aircraft operated by airlines.

The above features and others will appear more clearly on reading the following description of particular embodiments, given as non-limiting examples. The description refers to the accompanying drawings.

DETAILED DESCRIPTION

Figure 1:
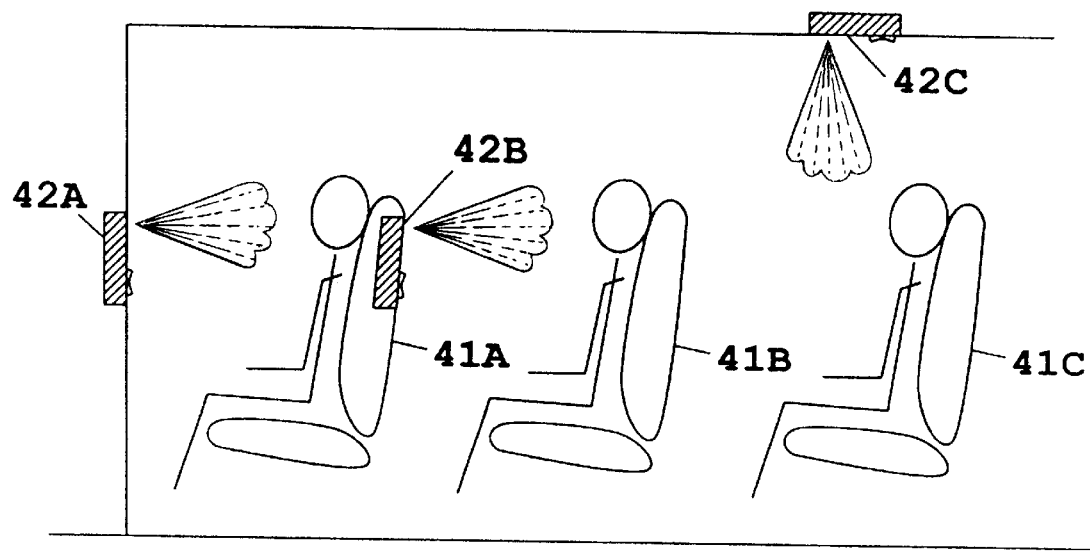
FIG. 1 is a diagram showing various ways in which the nozzles of a humidifier comprising self-contained individual installations can be installed.
Figure 7:
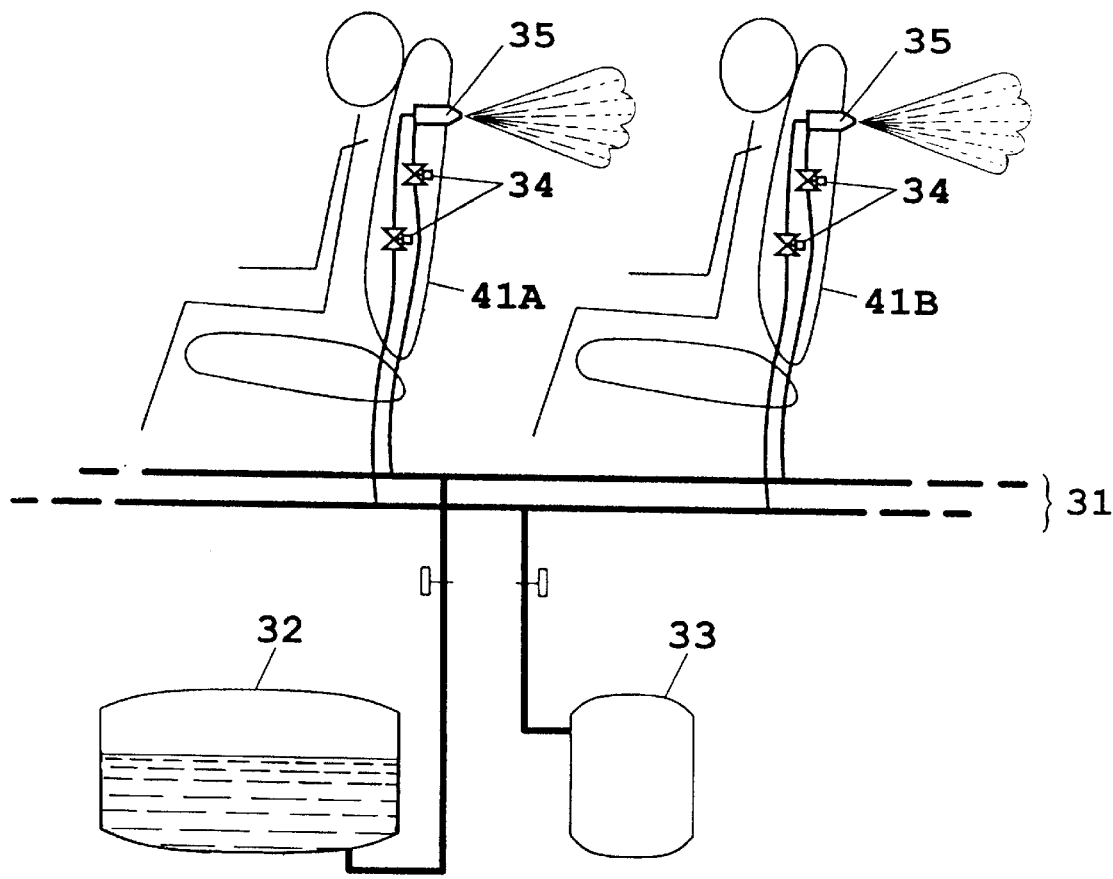
FIG. 7 is similar to FIG. 1 and shows a common feed system for a plurality of individual installations.

The system shown diagrammatically in FIG. 1 comprises individual installations, each having its own water supply. The installation 42A for a passenger occupying a seat 41A placed behind a bulkhead is incorporated in the bulkhead. The installation 42B for a passenger in a seat 41B is placed in the back of the seat situated in front thereof. Finally, installation 42C for another passenger occupying a seat 41C is placed in the ceiling or the baggage rack, above the passenger. The nozzle in each installation is for delivering water in the form of an aerosol jet 43 towards the upper portion of the passenger; the jet covers a solid angle that is large enough to accommodate variations in passenger size and in seatback inclination.

Figure 2:
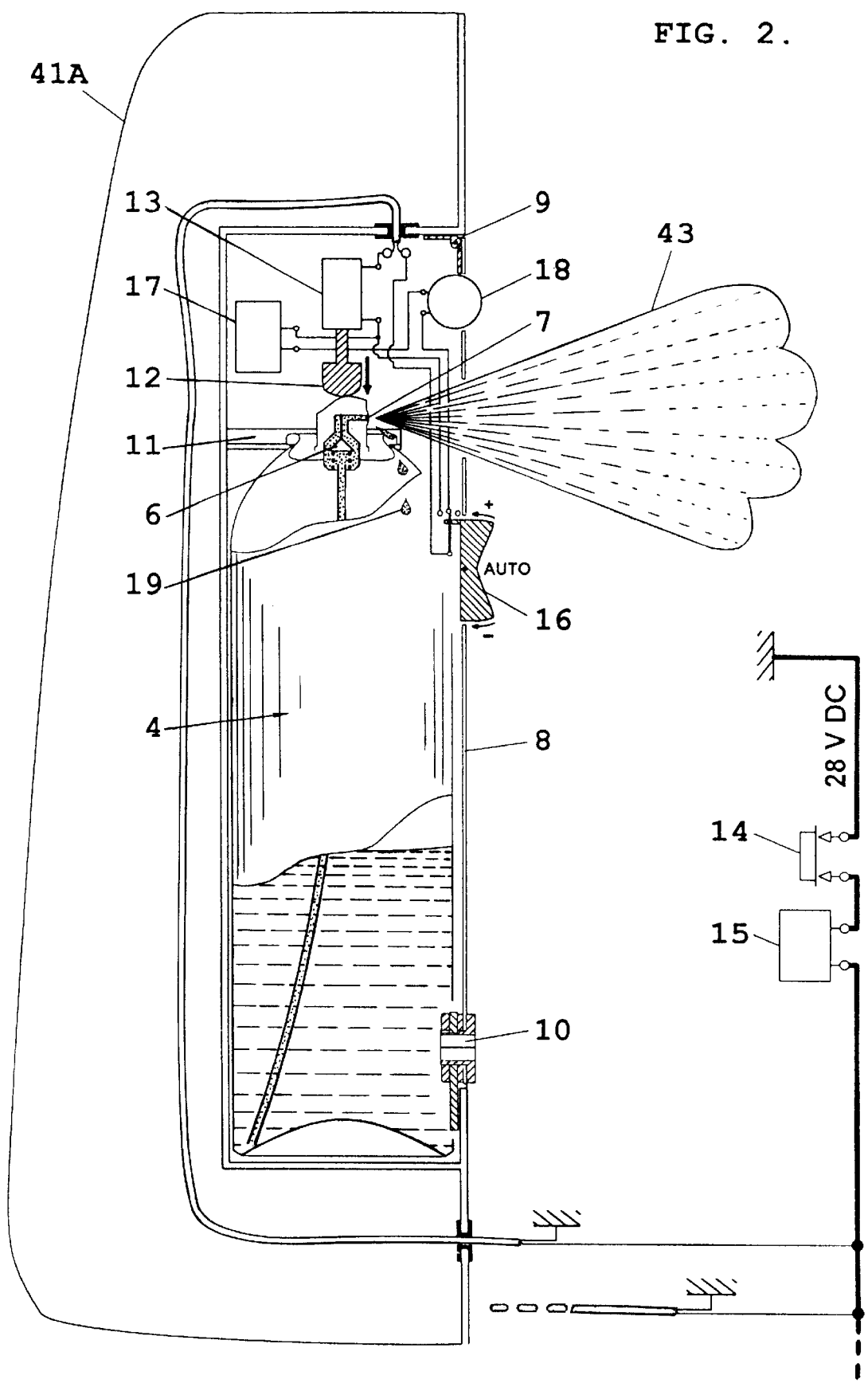
FIG. 2 is a diagram of a self-contained individual installation, including a commercial spray delivering an aerosol jet.
Figure 3A:
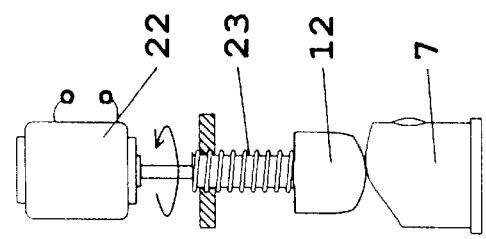
FIGS. 3A, 3B, and 3C show three possible structures for the electromechanical actuator of the FIG. 2 installation.
Figure 3B:
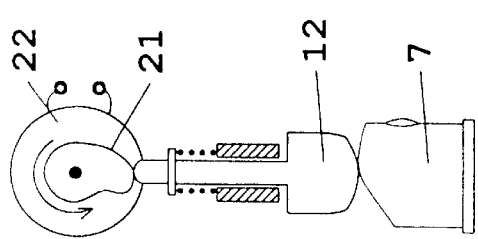
Figure 3C:
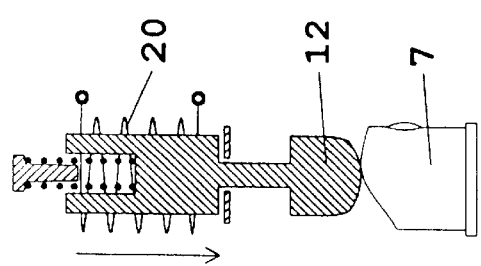
Figure 6:
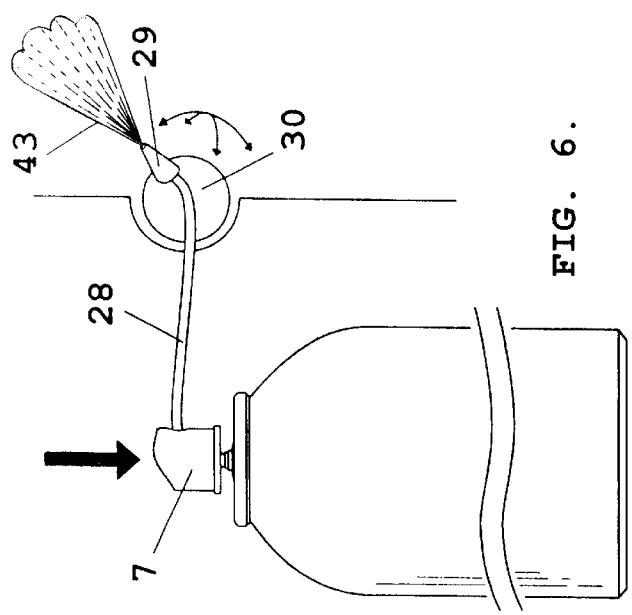
FIG. 6 is similar to FIG. 4, and shows yet another variant embodiment.
Figure 5:
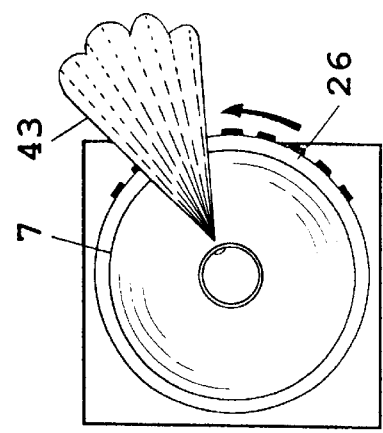
FIG. 5 is a diagramatic lefthand view of FIG. 4.
Figure 4:
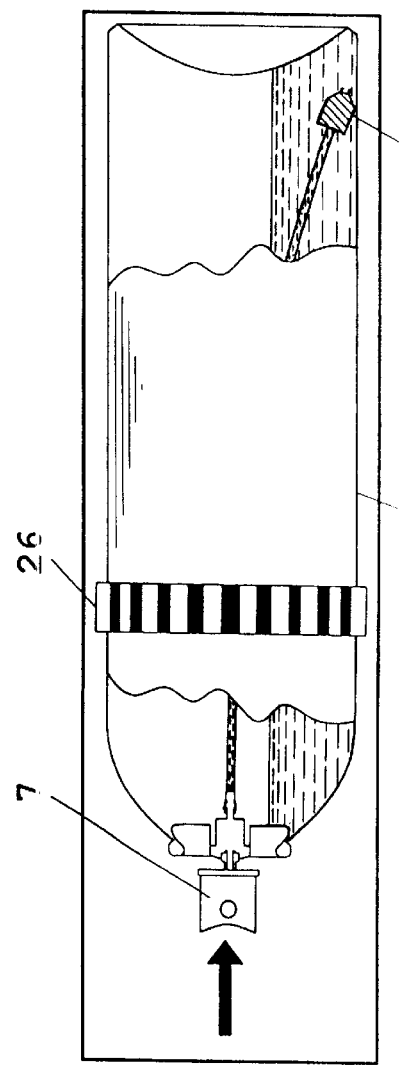
FIG. 4 shows another possible disposition of sprays belonging to individual installations, and designed for aiming the jet of water sprayed in the aerosol state.

The individual installation may have the structure shown diagrammatically in FIG. 2 for an installation placed in the back of a seat 41A.

This installation is designed to receive a cartridge having a can containing water and an inert gas (generally nitrogen) under pressure, together with a mechanically-actuated valve, and an ejection nozzle. It is possible, in particular, for the cartridge to be constituted by a commercially-available spray of low cost which is discarded after use. Such a spray 4 is very lightweight. It comprises a can of pure water and gas plus a top head combining the valve 6 to be opened by an axial mechanical force, and a nozzle 7. The volumes, dimensions, and characteristics of commercially available water sprays are very similar from one brand to another, and such sprays can easily be obtained at airports. The pressure of the gas is low enough to avoid any risk of explosion, even in the event of complete cabin depressurization. A spray can be replaced by another easily at stopovers by maintenance or cleaning personnel, or by the caterer who supplies the meals.

In the example shown in FIG. 2, the spray 4 is placed in a receptacle provided for that purpose in the back of the seat, behind a cover 8 swingable about a hinge 9. A latch 10 operated by a special tool prevents the occupant of the seat from interfering. The spray 4 may be put into place and held by releasable means, such as a resilient clip 11.

A guide may be provided in the receptacle to prevent the spray being put into place unless its nozzle 7 is directed towards an outlet window for the aerosol jet 43.

The spray may be controlled in a wide variety of ways.

One simple solution consists in providing a lever in the seatback enabling the passenger to push down the nozzle. A dash-pot or damper may be provided to slow down closure of the valve.

More frequently, the valve will be controlled by electromechanical means. As shown in FIG. 2, each receptacle for receiving a spray 4 is fitted with an electromechanical actuator 13 having a finger 12 which, when the actuator is electrically powered by a circuit, pushes down the nozzle 7 and opens the valve. The circuit shown includes both overall control and individual control. Overall control is by a switch 14 and/or a regulator 15. If a regulator is provided, it may be controlled by a humidity sensor, or by a processor that takes flight data into account (flight duration, altitude, etc. . . . ), or that implements a determined time cycle. "Forced" operation of all of the humidifiers may also be controlled automatically or by a member of the flight crew (usually the pilot) in the event of a fire. The sprayed water can thus locally absorb the heat given off by the fire, can fix certain pollutants contained in the smoke, and finally can act as a source of water to enable a passenger to wet a cloth to put over the face.

Individual control instead of or in addition to overall regulation comprises a three-position contactor switch 16 in the example shown in FIG. 2:

+=humidifier in forced operation auto=humidifier in regulated mode

−=humidifier off.

In regulated mode, operation may be made intermittent by placing, in series with the power supply circuits, a timer 17 and/or a switch 18 controlled by the humidity level. A presence sensor may be provided to prevent the valve being triggered if a person or an object is too close to the nozzle. The sensor may operate on optical, radar, infrared, or capacitive principles.

The few drops 19 that are not reduced to a mist by the nozzle 7 are not ejected into the cabin. They may be recovered in the receptacle or they may be intercepted by a movable mask that catches them on their trajectory at the very beginning of spraying.

FIGS. 3A, 3B, and 3C are examples showing three possible embodiments of the actuator 13.

In FIG. 3A, the finger 12 is actuated by an electromagnet powered by the contactor switch 16.

In FIG. 3B, the actuator is constituted by a motor 22 that rotates a cam 21 for pushing down the finger 12.

In FIG. 3C, the actuator comprises a wormscrew 23 actuated by a rotary motor 22. The finger 12 is allowed to return by reversing the motor or by a clutch mechanism provided for the screw on reaching the end of its stroke.

FIGS. 4 and 5 show a modified embodiment of the invention in which the spray 4 is placed horizontally in a receptacle fitted with a knob or thumb wheel 26 accessible from the outside and enabling the nozzle 7 to be aimed. In this case, the flexible dip tube 27 for feeding water to the nozzle must be fitted with a weight to sink it. This disposition has the drawback of preventing the use of a spray of a type that is commonly commercially available.

Another solution enabling the occupant of a seat to aim the jet 43 at will is shown in FIG. 6. The individual equipment then comprises an outlet 29 mounted in a ball 30 and fed by a flexible tube 28 that may be engaged in the nozzle 7.

When the nozzle is carried by a seatback, a linkage may be located in the seat to adjust the angular position of the nozzle responsive to the degree of tilt of the back, for the nozzle to remain directed to the zone where the face of the passenger located behind the seat is prone to be located.

FIG. 7 relates to a system in which a plurality of spray nozzles 35 are fed from a common circuit taking water from a tank 32. The tank may be under pressure. However, given its volume, it is more advantageous to use a separate supply of gas 33. The controllable closure means then comprise, for each individual installation, two electrically controlled valves 34, one associated with the water tank, and the other with the source of gas. The valves 34 may be located in the immediate proximity of the corresponding nozzles, thereby reducing risks of contamination that would otherwise exist in overall humidifier equipment. A plurality of tanks may be spaced apart in an airplane of large capacity.

I claim:

1. A system for humidifying air in an aircraft cabin, comprising, at each of a plurality of locations each apt to be occupied by one passenger, a respective individual unit having a pressurized water supply and a spray nozzle directed towards a local zone selected to include a face of said passenger and controllable closure valve means located to be individually actuatable by said passenger and connected to said nozzle to feed pressurized water thereto, wherein said nozzle is constructed to be aimable by the respective passenger.

2. A system according to claim 1, wherein each of said nozzles is carried by a seatback, a ceiling, a baggage rack, or a partition.

3. A system according to claims 1, wherein each of said nozzles is connected to an aimable outlet via a flexible hose.

4. A system wherein said nozzle is constructed to be amiable by the respective passenger for humidifying air in an aircraft cabin comprising, at each of a plurality of locations each apt to be occupied by a passenger, a respective individual unit having a pressurized water supply and a spray nozzle directed towards a local zone selected to include a face of said passenger and controllable closure valve means located to be individually actuatable by said passenger and connected to said nozzle to feed pressurized water thereto, wherein each of said individual valve means is designed to cut off water delivery to the respective nozzle and to feed said nozzle continuously, at will.

5. A system according to claim 4, further comprising means for forced opening of all of the closure valve means automatically in the event of a fire or responsive to an action taken by a member of a flight crew.

6. A system according to claim 1, further comprising an overall feed control for simultaneous opening of all said closure valve means.

7. A system for humidifying air in an aircraft cabin comprising, at each of a plurality of locations each apt to be occupied by a passenger, a respective individual unit which consists of a removable self contained cartridge comprising a can of water and pressurizing gas, a top head combining a spray nozzle directed toward a local zone selected to include a face of said passenger and controllable closure valve means located to be individually actuatable by said passenger.

8. A system according to claim 7, further comprising, at each said location, a housing for said spray provided with a lockable cover formed with a passage for sprayed water.

9. A system for humidifying air in an aircraft cabin, comprising, at each of a plurality of locations each apt to be occupied by a passenger, a receptacle formed in a seat back in front of said location for receiving a removable and replaceable unit comprising a pressurized water supply can, a nozzle aimable toward a zone selected to include a face of said passenger and closure valve means mechanically actuatable from a closed condition to deliver water to said nozzle, and an actuator in said receptacle, controllable at will by said passenger for opening the closure valve means and causing delivery of pressurized water from said can to said nozzle.

10. An aircraft passager seat assembly, having:

a reclining seat back, in a receptacle of said seat back, an individual water supply cartridge containing a source of gas pressurized water communicating with an individual spray nozzle aimable toward a zone selected to include a face of a passenger seated behind the seat assembly, and closure valve means controllable by said passenger and located between said water source and said nozzle to feed pressurized water to the latter.

11. An aircraft passenger seat assembly according to claim 10, further comprising:

an electromechanical actuator arranged to forcibly open said closure valve means when energized, and switch means for selection between forced operation of all closure valve means in a same aircraft upon a common actuation, de-energization and individual regulated mode.

\* \* \* \* \*